(12) United States Patent
Villalobos et al.

(10) Patent No.: US 10,934,172 B2
(45) Date of Patent: Mar. 2, 2021

(54) IN SITU GROWN SIC COATINGS ON CARBON MATERIALS

(71) Applicant: The Government of the United States of America, as represented by the Secrectary of the Navy, Arlington, VA (US)

(72) Inventors: Guillermo R. Villalobos, Springfield, VA (US); Michael Hunt, Alexandria, VA (US); Bryan Sadowski, Falls Church, VA (US); Jasbinder S. Sanghera, Ashburn, VA (US); Ishwar D. Aggarwal, Waxhaw, NC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 15/606,110

(22) Filed: May 26, 2017

(65) Prior Publication Data

US 2017/0260056 A1    Sep. 14, 2017

Related U.S. Application Data

(62) Division of application No. 13/451,826, filed on Apr. 20, 2012, now Pat. No. 9,663,374.

(Continued)

(51) Int. Cl.
*C01B 32/956* (2017.01)
*C01B 32/97* (2017.01)
(Continued)

(52) U.S. Cl.
CPC ............ *C01B 32/956* (2017.08); *C01B 32/97* (2017.08); *C04B 35/52* (2013.01); *C04B 35/573* (2013.01);
(Continued)

(58) Field of Classification Search
CPC . C01B 32/956; C04B 41/5059; C04B 35/565; C04B 41/4529
See application file for complete search history.

(56) References Cited

U.S. PATENT DOCUMENTS 3,892,583 A * 7/1975 Winter ................ C01B 21/0828
501/92
4,133,689 A * 1/1979 Stroke .................. C01B 32/956
264/645

(Continued)

FOREIGN PATENT DOCUMENTS

JP        57-155365    *  9/1982
JP        58-173872    * 10/1983
(Continued)

OTHER PUBLICATIONS

Lai, H.L., et al., "Straight b-SiC nanorods synthesized by using C—Si—SiO2". Appl. Phys. Lett. 76, 294 (2000), pp. 294-296; https://doi.org/10.1063/1.125636.*

(Continued)

*Primary Examiner* — Bret P Chen
(74) *Attorney, Agent, or Firm* — US Naval Research Laboratory; Rebecca L. Forman

(57) ABSTRACT

A β-SiC coating made by the method of mixing $SiO_2$ with carbon and heating the mixture in vacuum wherein the carbon is oxidized to CO gas and reduces the $SiO_2$ to SiO gas and reacting a carbon material, comprising stainless steel with a carbon coating, with the SiO gas at a temperature in the range of 1300 to 1600° C. resulting in a SiC coating on the stainless steel.

4 Claims, 2 Drawing Sheets

Related U.S. Application Data

(60) Provisional application No. 61/477,668, filed on Apr. 21, 2011.

(51) Int. Cl.

| | | |
|---|---|---|
| *C04B 41/87* | (2006.01) | |
| *C04B 41/89* | (2006.01) | |
| *C04B 35/573* | (2006.01) | |
| *C04B 41/00* | (2006.01) | |
| *C04B 41/50* | (2006.01) | |
| *C04B 41/52* | (2006.01) | |
| *C04B 35/52* | (2006.01) | |

(52) U.S. Cl.
CPC ........ *C04B 41/009* (2013.01); *C04B 41/5059* (2013.01); *C04B 41/52* (2013.01); *C04B 41/87* (2013.01); *C04B 41/89* (2013.01); *C04B 2235/3418* (2013.01); *C04B 2235/424* (2013.01); *C04B 2235/425* (2013.01); *C04B 2235/441* (2013.01); *C04B 2235/762* (2013.01); *Y10T 428/30* (2015.01)

(56) References Cited

U.S. PATENT DOCUMENTS

| | | | | | |
|---|---|---|---|---|---|
| 4,329,699 | A | * | 5/1982 | Ishihara | H01L 31/03765 257/55 |
| 4,571,331 | A | * | 2/1986 | Endou | B82Y 30/00 264/332 |
| 4,696,827 | A | * | 9/1987 | Okamura | C04B 35/806 427/227 |
| 4,783,368 | A | * | 11/1988 | Yamamoto | H01L 21/4803 257/E23.006 |
| 4,869,929 | A | * | 9/1989 | Cabrera | C23C 10/60 427/249.15 |
| 4,981,668 | A | * | 1/1991 | Dosaj | C01B 33/025 423/346 |
| 5,052,339 | A | * | 10/1991 | Vakerlis | C23C 16/4558 118/723 E |
| 5,200,022 | A | * | 4/1993 | Kong | C30B 25/02 117/95 |
| 5,688,366 | A | * | 11/1997 | Ichinose | H01L 31/022475 136/244 |
| 6,022,515 | A | * | 2/2000 | Støle | C01B 32/956 423/345 |
| 6,080,928 | A | * | 6/2000 | Nakagawa | H01L 31/022425 136/249 |
| 6,300,226 | B1 | * | 10/2001 | Miyata | C04B 35/565 438/488 |
| 6,812,473 | B1 | * | 11/2004 | Amemiya | G03F 1/20 250/492.1 |
| 9,157,146 | B2 | * | 10/2015 | Sugawara | C23C 14/0078 |
| 2002/0029638 | A1 | * | 3/2002 | Kurtz | G01L 1/2293 73/715 |
| 2006/0089248 | A1 | * | 4/2006 | Bandyopadhyay | C04B 35/565 501/88 |
| 2010/0270562 | A1 | * | 10/2010 | Ogihara | H01L 31/03044 257/77 |
| 2011/0175024 | A1 | * | 7/2011 | Lang | C04B 35/565 252/182.32 |
| 2011/0262339 | A1 | * | 10/2011 | Rauleder | C01B 33/025 423/350 |
| 2012/0088088 | A1 | * | 4/2012 | Garnier | B82Y 30/00 428/292.1 |

FOREIGN PATENT DOCUMENTS

| | | | |
|---|---|---|---|
| JP | 59-228777 | * | 12/1984 |
| JP | 60-117682 | * | 6/1985 |

OTHER PUBLICATIONS

Zhou, X.T., et al., "b-SiC nanorods synthesized by hot filament chemical vapor deposition". Appl. Phys. Lett. 74, 3942 (1999), pp. 3942-3944; https://doi.org/10.1063/1.124231.*

Milewski, J.V., et al., "Growth of beta-silicon carbide whiskers by the VLS process". Journal of Materials Science 20 (1985) 1160-1166.*

Davis, Robert F., et al., "Thin Film Deposition and Microelectronic and Optoelectronic Device Fabrication and Characterization in Monocrystalline Alpha and Beta Silicon Carbide". Proceedings of the IEEE, vol. 79. No. 5, May 1991, pp. 677-701.*

Riviere, J.-P., et al., "Corrosion protection of an AISI 321 stainless steel by SiC coatings". Surface and Coatings Technology, vols. 100-101, Mar. 1998, pp. 243-246.*

Mokhtarian, Javad, et al., "Effect of silane coating containing SiC nanoparticles on the corrosion behaviour of stainless steel 304". Micro & Nano Letters, 2018, vol. 13, Iss.8, pp. 1203-1208.*

Nishino, Shigehiro, et al., "Preparation of B-SiC films by r.f. sputtering". Thin Solid Films, 40 (1977) L27-L29. p. L27 only.*

* cited by examiner

IN SITU GROWN SIC COATINGS ON CARBON MATERIALS

CROSS-REFERENCE TO RELATED APPLICATIONS

This application is a divisional application of U.S. application Ser. No. 13/451,826 filed on Apr. 20, 2012 (issued as U.S. Pat. No. 9,663,374), which claimed the benefit of U.S. Provisional Application 61/477,668 filed on Apr. 21, 2011; the entire contents of both are incorporated herein by reference.

BACKGROUND OF THE INVENTION

Field of the Invention

The present invention relates generally to SiC coatings and more specifically to SiC coatings on carbon materials.

Description of the Prior Art

SiC is a hard, strong, chemically resistant material that is thermally and electrically conductive. Due to its covalent bonding, it is very difficult to densify without the use of additives that compromise its material properties. However, in many cases a monolithic material is not needed. SiC can be deposited as a coating by techniques such as chemical vapor deposition (CVD), plasma enhanced CVD, and direct chemical reaction between carbon and molten silicon. SiC coatings are used to protect a weaker or less resistant material by isolating it from the environment. The protection can be in the form of mechanical protection such as wear or abrasion resistance, or chemical protection in corrosive or reactive environments. Examples of mechanical protection are wear resistant coatings on bearings and wear plates. Examples of chemical protection are coated filters for molten metals and coatings for the chemical industry. An example of a combination of wear resistance and chemical resistance where SiC coating are used is in gas turbine engines.

CVD of SiC requires specialized equipment that can hold temperatures of 2000° C. at a pressure of 0.5 Torr+/−0.001 for up to 10 days. The growth process is relatively slow and expensive. The gasses used are methylsilane and trimethylsilane which are extremely flammable and considered hazardous.

The direct chemical method infiltrates carbon fleece with molten silicon at 1700° C. The carbon and Si is placed on the material to be coated and heated to 700° C. to bond. The substrate and carbon and silicon mix is heated to 1700° C. to react the Si and C to make SiC. The reaction is generally not complete and is composed of SiC and free Si. Since the reaction is a liquid phase reaction, the impurities are not volatilized as they are in a vapor phase reaction and result in a coating that is dependent on the purity of the silicon.

BRIEF SUMMARY OF THE INVENTION

The aforementioned problems are overcome in the present invention which provides a method of forming a β-SiC material or coating by mixing $SiO_2$ with carbon and heating the mixture in vacuum wherein the carbon is oxidized to CO gas and reduces the $SiO_2$ to SiO gas and reacting a carbon material with the SiO gas at a temperature in the range of 1300 to 1600° C. resulting in a SiC material or a SiC coating on a substrate. Also disclosed is the related SiC material or coating prepared by this method.

The present invention provides a technique to coat substrates with SiC that can be operated as low as 1300° C., which is a much lower temperature than previous techniques: CVD of SiC operates at 2000° C. while the direst chemical method operates at 1700° C. The lower temperature opens up the coating technique to many non-refractory materials and even some commercially important metals such as steel and titanium.

The present invention also provides a technique that uses inexpensive raw materials that are not hazardous. CVD uses expensive liquids and gasses that are hazardous. This would decrease the cost of coating SiC not only due to the lower raw material cost, but also because handling of flammable and toxic precursors and waste material is no longer necessary.

The present invention further provides a technique that uses simple vacuum furnaces and reaction vessels unlike CVD where specialized equipment is needed.

These and other features and advantages of the invention, as well as the invention itself, will become better understood by reference to the following detailed description, appended claims, and accompanying drawings.

DETAILED DESCRIPTION OF THE INVENTION

The present invention pertains to forming β-SiC on a carbon containing substrate. The SiC can be in the form of a coating or can completely replace the carbon material with β-SiC. It is also possible to coat a material not containing carbon by first coating said material with carbon and then reacting the carbon coating to form β-SiC.

The β-SiC can be deposited on a carbon substrate by reacting said carbon substrate with SiO gas. A carbon substrate is defined as all materials that are made up of carbon such as, but not limited to graphite, vitreous carbon, amorphous carbon, and diamond. The SiO directly reacts at temperatures of 1300-1600° C. with the carbon to form a coating or if the material is sufficiently thin (<50 microns) the entirety of the material can be converted to β-SiC.

The SiO gas is formed by mixing $SiO_2$ with carbon and heating in vacuum. The carbon is oxidized to CO gas and reduces the $SiO_2$ to SiO gas which flows over the carbon substrate and forms SiC. $SiO_2$ includes but is not limited to powder, alkoxide precursors, crystalline or glassy morphologies. Carbon includes any material that can supply carbon to the reaction such as graphite, vitreous carbon, activated carbon, carbon black, and carbon containing organic compounds such as sugar, fructose, and sucrose.

The material can be heated in a sintering furnace capable of operating in vacuum. The reaction vessel can be as simple as a lidded crucible with the part to be coated suspended inside the crucible. A more complex vessel would have a reaction zone for the $SiO_2$ and C and a fixture for the substrate to be coated. The vessel is loaded with the $SiO_2$+C charge and the substrate. The vessel is sealed and placed in the furnace. The furnace is ramped at 5° C./minute to the operating temperature and held. The result will be a SiC coated substrate.

Alternatively the substrate can be a porous carbon material. In this case the entirety of the carbon may be converted to SiC due to the thinness of the carbon structural units in the porous material.

New designs of the reaction vessel can be envisioned to coat multiple samples at once. It may also be possible to form the SiO gas at one temperature while the material to be coated is at a much lower temperature. It may be possible to form the SiO gas using other reactants that do not involve the reduction of $SiO_2$ by carbon.

Example 1

Figure 1:
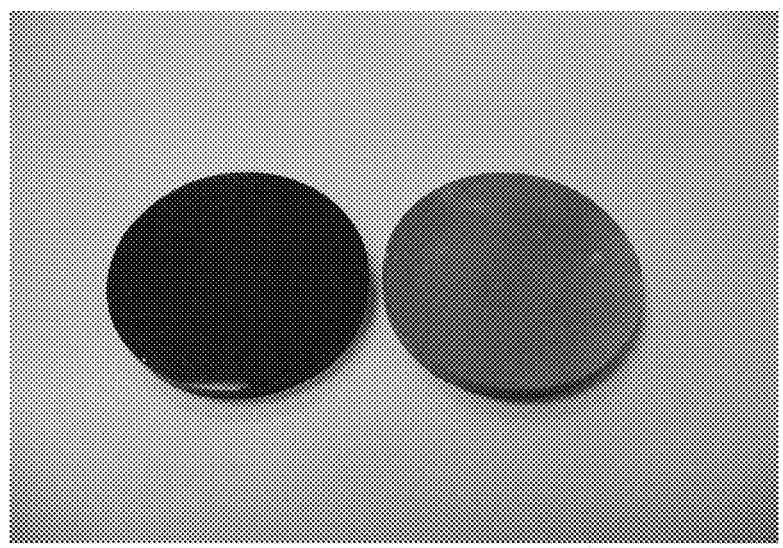
FIG. 1 shows an uncoated vitreous carbon disk (left) and an SiC coated vitreous carbon disk (right).
Figure 2:
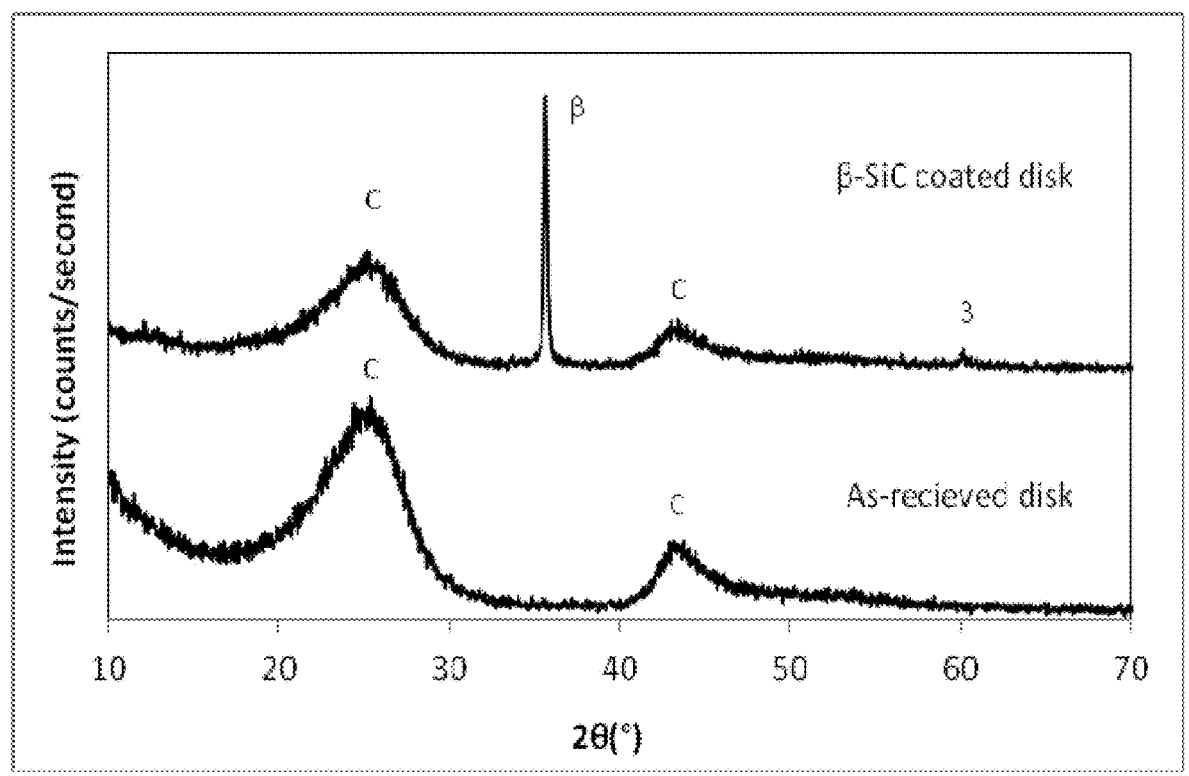
FIG. 2 is an XRD pattern of an as-received vitreous carbon disk (bottom) and a vitreous carbon disk that was run at 1600° C. for 4 hours showing the formation of a β-SiC coating (top) C-vitreous carbon, β-β-SiC.

$SiO_2$ powder and activated carbon are mixed with a mortar and pestle. The mixture is placed in a vitreous carbon reaction vessel. A vitreous carbon disk is placed in the vessel. The vessel is placed in a graphite vacuum furnace and heated to 1600° C. at 5° C./min and held for 4 hours. FIG. 1 shows a photograph of the disk before and after coating with SiC. FIG. 2 is an X-ray diffraction pattern of the vitreous carbon disk before and after coating.

Example 2

Figure 3:
FIG. 3 shows an uncoated crucible (left) and an SiC-coated crucible (right).

Tetraethylorthosilicate (TEOS) which is an alkoxide precursor for $SiO_2$ is mixed with dissolved sugar and dried. The dried mixture is placed in a vitreous carbon crucible having a large height to diameter ratio. The crucible is caped, placed in a vacuum furnace and heated at 5° C./minute to 1600° C. for 10 hours. FIG. 3 shows an uncoated crucible and a SiC-coated crucible.

Example 3

This example is the same process as either example 1 or 2 with the exception that a porous carbon material is placed in the reaction vessel. The result is a SiC porous material.

Example 4

This example uses an alternative host, in this case $Al_2O_3$, although it could be any other substrate, which was coated with a carbon coating. The surface was then reacted in a similar manner to example 1. This converted the carbon coating to SiC.

Example 5

This example uses an alternative host, in this case stainless steel, which was coated with a carbon coating. The surface was then reacted in a similar manner to example 1. This converted the carbon coating to SiC.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A β-SiC coating directly contacting stainless steel formed by the method comprising:
   mixing $SiO_2$ with carbon;
   placing the $SiO_2$ and carbon mixture in a reaction vessel;
   separately placing a carbon substrate in the reaction vessel containing the $SiO_2$ and carbon mixture, wherein the carbon substrate is stainless steel with a carbon coating; and
   heating the reaction vessel in vacuum at a temperature in the range of 1300 to 1600° C., wherein the carbon is oxidized to CO gas and reduces the $SiO_2$ to SiO gas, wherein the carbon coating on the stainless steel is converted to a β-SiC coating resulting in a β-SiC coating directly contacting the stainless steel.

2. The β-SiC coating formed by the method of claim 1, wherein the carbon substrate comprises graphite, vitreous carbon, amorphous carbon, diamond, or any combination thereof.

3. β-SiC coating formed by the method of claim 1, wherein $SiO_2$ is a powder, an alkoxide precursor, a crystalline or glassy morphology, or any combination thereof.

4. The β-SiC coating formed by the method of claim 1, wherein the carbon mixed with the $SiO_2$ comprises graphite, vitreous carbon, activated carbon, carbon black, carbon containing organic compounds, or any combination thereof.

* * * * *